United States Patent [19]
Bräunling et al.

[11] 3,915,687
[45] Oct. 28, 1975

[54] HERBICIDE
[75] Inventors: Hermann Bräunling, Munich; Frank Müller, Siegertsbrunn, Germany; Karl Milles, Holzkirchen, all of Germany
[73] Assignee: Consortium fur Elektrochemische Industrie GmbH, Munich, Germany
[22] Filed: Nov. 12, 1973
[21] Appl. No.: 415,269

[30] Foreign Application Priority Data
Nov. 21, 1972 Germany...................... 2257034

[52] U.S. Cl. .................................................. 71/88
[51] Int. Cl.² ......................................... A01N 9/28
[58] Field of Search ....................................... 71/88

[56] References Cited
UNITED STATES PATENTS
3,235,364  2/1966  Siegel..................................... 71/88
3,689,507  9/1972  Gates et al............................. 71/88

OTHER PUBLICATIONS
McCabe et al., Chem. Abst., Vol. 49, 5383f.
Rene et al., Chem. Abst. Vol. 76, (1972), 112996e.

Primary Examiner—Lewis Gotts
Assistant Examiner—Catherine L. Mills
Attorney, Agent, or Firm—Allison C. Collard

[57] ABSTRACT
A herbicide containing as active constituent, in the presence of an inert carrier, an effective amount of one or several cumarilic acid amides of the general formula

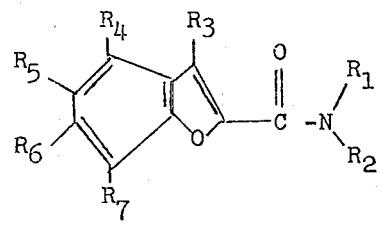

wherein
$R_1$ represents hydrogen, an alkyl radical with 1 – 3 carbon atoms or —$OCH_3$;
$R_2$ hydrogen or an alkyl radical with 1 – 3 carbon atoms;
$R_3$ hydrogen or the methyl radical;
$R_4$, $R_5$, $R_6$ and $R_7$ hydrogen, halogen, an alkyl radical with 1 – 3 carbon atoms, or —$OCH_3$ and wherein of the radicals $R_4$, $R_5$, $R_6$ and $R_7$ at least three are hydrogen and only one is an other radical.

9 Claims, No Drawings

HERBICIDE

The present invention relates to a herbicide which contains as an active ingredient one or several cumarilic acid amides of the formula

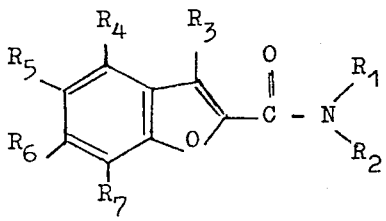

wherein
- $R_1$ represents hydrogen, an alkyl radical with 1 – 3 carbon atoms or —$OCH_3$,
- $R_2$ hydrogen or an alkyl radical with 1 – 3 carbon atoms,
- $R_3$ hydrogen or the methyl radical,
- $R_4$, $R_5$, $R_6$ and $R_7$ hydrogen, halogen, an alkyl radical with 1 – 3 carbon atoms, or -$OCH_3$ and wherein of the radicals $R_4$, $R_5$, $R_6$ and $R_7$ at least three are hydrogen and only one is an other radical.

The preferred elements or radicals are the following:
- $R_1$ = Hydrogen, methyl, —$OCH_3$ or Ethyl
- $R_2$ = hydrogen, methyl or ethyl
- $R_3$ = hydrogen or methyl
- $R_4$, $R_5$, $R_6$, $R_7$ = hydrogen, chlorine, methyl or —$OCH_3$.

The cumarilic amides are known from the literature. However, it has now been discovered that a certain group of this class of compounds has a herbicidal action. More particularly, the compounds are effective in after-germination, where they have partly a selective action and are almost totally herbicidal. The preparation of the cumarilic acid amides is effected in a manner known per se by reaction of the respective chlorides with ammonia, or primary or secondary amines, if necessary with the addition of inert solvents immiscible with water, such as benzene, diethyl ether, or chloroform.

The active ingredients may be made into emulsion concentrates, powders for spraying, or dusting powders according to known methods.

a. Emulsion concentrates contain about;
- 10 – 50 percent by weight active ingredients
- 25 – 80 percent by weight organic solvents, e.g. benzene, toluene, xylene, cyclohexanone, isopropanol, butanol, glycol ether, ethoxymethanol, butoxyethanol, and
- 5 – 15 percent by weight dispersing agents, e.g. sodium alkyl-benzene sulfonate, calcium dodecyl-benzene sulfinate, alkylpolyglycol ether, condensation products of alkylphenol and ethylene oxide, and sodium alkylnaphthalene sulfonate.

They are made by intensive mixing of the ingredients in a stirrer.

b. Spraying powders contain in general;
- 30 – 80 percent by weight of active compound.
- Some percent by weight of dispersing agents and, if desired,
- 10 – 60 percent by weight of inert ingredients such as kaolin, montmorillonite, china-clay, magnesium carbonate, calcium carbonate, kieselgur, highly dispersed silicic acid.

c. Dusting powders consist mostly of;
- 5 – 25 percent by weight of active ingredients, and inert ingredients which may be the same as mentioned for spraying powders.

When the powders are made, the active ingredient is intimately mixed with the other substances, then ground to a grain size of mostly less than 20 $\mu$ on a sledge hammer mill or other suitable grinding device, mixed once more, and finally passed through a sieve for purification.

In addition to the active compounds according to the invention, other known active ingredients may be used, belonging to the class of ureas, aryloxy fatty acids, triazines, carbamates and thiolcarbamates, the dinitroalkyl anilines, acylanilides, and dinitrophenols for combined effectiveness. By these means, it is possible to increase the activity or to improve the compatibility with the cultures.

In the following, the invention will be more fully described in a number of examples, which are given by way of illustration but not of limitation.

EXAMPLE 1 (Preparation)

The general description of preparing the herbicides according to the invention relates to the compounds listed in the TABLE 1 hereinbelow. Where no reference is made to the literature, the compounds have been prepared here for the first time.

The cumarilic acid chloride, corresponding to the desired amide, is dissolved in ten times the amount of benzene. To the solution, 2.1 mol ammonia is added per mol chloride used at a temperature of 30°-50°C; actually, the appropriately substituted amine or aqueous solutions thereof may be added, in the case of ammonia, methyl-and dimethylamine. After the addition is terminated, stirring is continued for another half hour at 30°C. Subsequently the solution is shaken first with 1/10 part by volume of water, calculated on the volume of the benzene solution, then with 2 N HCl, and twice with saturated sodium bicarbonate solution.

From the benzene solution, the cumarilic acid amide is obtained after the solvent is dried over amhydrous sodium sulfate and evaporated in a water jet vacuum, with a purity of 95 – 97% and a yield of 80 – 90%.

When compounds are obtained as oily liquids, instead of the melting point we use for characterization the position of the proton resonance signal of the hydrogen atom in alpha position of the substituent of the nitrogen atom. The δ-values for substance 2 (in the table) are at 2.92 ppm and for substances 9 and 14 at 3.43 ppm.

TABLE I

| Nr. | $R_1$ | $R_2$ | $R_3$ | $R_4$ | $R_5$ | $R_6$ | $R_7$ | Fp. °C | Fp. Lit. °C |
| --- | --- | --- | --- | --- | --- | --- | --- | --- | --- |
| 1 | $CH_3$ | $CH_3$ | H | H | H | H | H | 34 – 36 | 34 – 36 |
| 2 | $CH_3$ | $CH_3$ | $CH_3$ | H | H | H | H | 01 | kp$_4$ 159 – 61 |
| 3 | $C_2H_5$ | $C_2H_5$ | $CH_3$ | H | H | H | H | 61 | 63 – 64 |
| 4 | $CH_3$ | $CH_3$ | $CH_3$ | H | Cl | H | H | 59 – 60 | |
| 5 | H | H | $CH_3$ | H | H | H | H | 142 – 44 | 145 |
| 6 | H | $CH_3$ | $CH_3$ | H | H | H | H | 123 – 25 | 124 – 25 |
| 7 | $C_2H_5$ | $C_2H_5$ | H | H | Cl | H | H | 56 – 57 | |
| 8 | $C_2H_5$ | $C_2H_5$ | $CH_3$ | H | Cl | H | H | 56 – 58 | |

TABLE I – Continued

| Nr. | R₁ | R₂ | R₃ | R₄ | R₅ | R₆ | R₇ | Fp. °C | Fp. Lit. °C |
|---|---|---|---|---|---|---|---|---|---|
| 9 | C₂H₅ | C₂H₅ | CH₃ | H | CH₃ | H | H | 01 | |
| 10 | H | OCH₃ | CH₃ | H | Cl | H | H | 157 – 159 | |
| 11 | CH₃ | OCH₃ | CH₃ | H | Cl | H | H | 63 – 64 | |
| 12 | n—C₃H₇ | n—C₃H₇ | CH₃ | H | Cl | H | H | 75 – 76 | |
| 13 | i—C₃H₇ | i—C₃H₇ | CH₃ | H | Cl | H | H | 88 – 91 | |
| 14 | C₂H₅ | C₂H₅ | CH₃ | H | H | CH₃ | H | 52 – 54 | |

EXAMPLE 2

| | Emulsion Concentrate |
|---|---|
| Active Ingredient | 10 – 50% by weight |
| Cyclohexanone | 20 – 60% by weight |
| Xylene | 5 – 20% by weight |
| Emulsifier IHS | 5 – 15% by weight |

IHS is a mixture of sodium alkyl benzenesulfonate, alkylpolyglycol ether and solvent; IHS is a commercial name of the Chemical Manufacturers Hüls (Germany).

EXAMPLE 3

| | Spraying Powder |
|---|---|
| Active ingredient | 30 – 80% by weight |
| Sodium sulfo succinic acid dioctyl ester | 2 – 3% by weight |
| Sodium lignine-sulfonate | 0 – 4% by weight |
| Highly dispersed silicic acid | 0 – 3% by weight |
| Kaolin | 10 – 60% by weight |

EXAMPLE 4

| | Dusting Powder |
|---|---|
| Active ingredient | 5 – 25% by weight |
| Highly dispersed silicic acid | 00 – 1% by weight |
| Calcium carbonate | 70 – 95% by weight |

EXAMPLE 5

Testing for herbicidal properties;

The following plants were set out in dishes in a glass (green) house:

| (Corn) Zea-Mays | (Barley) Hordeum | (Crab Grass) Digitaria |
| (Oats) Arena Fatua | (Mustard) Sinapis | (Corn Flower) Centaurea |
| (Cleavers) Gallium Aparine | (Sugar Beets) Beta | |

14 days after germination, the plants were treated with 6 kg/ha of active ingredient which was formulated as emulsion concentrate in the following manner:

| Active ingredient | 20% by weight |
|---|---|
| Cyclohexanone | 50% by weight |
| Xylene | 20% by weight |
| Emulsifier IHS (as above explained) | 10% by weight |

Evaluation occurred the last time 28 days after spraying. Table 2 shows the results.

TABLE 2

| Plants Compound | Corn | Barley | Crab Grass | Oats | Mustard | Beets | Corn Flower | Cleavers |
|---|---|---|---|---|---|---|---|---|
| 1 | 3 | 3 | 9 | 8 | 9 | 9 | 3 | 4 |
| 2 | 3 | 2 | 9 | 1 | 3 | 10 | 2 | 3 |
| 3 | 2 | 7 | 9 | 6 | 7 | 7 | 1 | 4 |
| 4 | 5 | 6 | 9 | 7 | 8 | 10 | 2 | 4 |
| 5 | 1 | 2 | 3 | 2 | 9 | 6 | 3 | 3 |
| 6 | 1 | 2 | 4 | 5 | 5 | 7 | 2 | 2 |
| 7 | 10 | 7 | 7 | 8 | 8 | 8 | 7 | 9 |
| 8 | 10 | 4 | 5 | 5 | 6 | 8 | 0 | 3 |
| 9 | 10 | 7 | 5 | 7 | 7 | 9 | 2 | 7 |
| 12 | 6 | 1 | 1 | 1 | 1 | 1 | 0 | 1 |
| 13 | 8 | 2 | 2 | 1 | 3 | 4 | 0 | 0 |
| 14 | 10 | 8 | 6 | 8 | 10 | 9 | 3 | 8 |

Code:
0= no action
10= plants completely destroyed

As table 2 shows, compounds 1 and 3 attack weeds in corn to a large extent without damaging the culture plants. On the other hand, preparations 9 and 14 are herbicides which may be used with ornamental plants belonging to the genus of centaurea (corn flower).

While the product of the present invention has been described mainly in respect to only a few specific examples for purposes of a complete and detailed disclosure, it will be readily apparent to those skilled in the art that many other embodiments and modifications are within the purview of this invention. Accordingly, the instance invention should not be construed as limited in any particulars except as recited in the appended claims or required by the prior art.

What is claimed is:

1. A method of destroying undesirable vegetation which comprises applying to said vegetation a herbicidally effective amount of a herbicide containing as active ingredient, in an inert carrier, at least one cumarilic acid amide of the formula

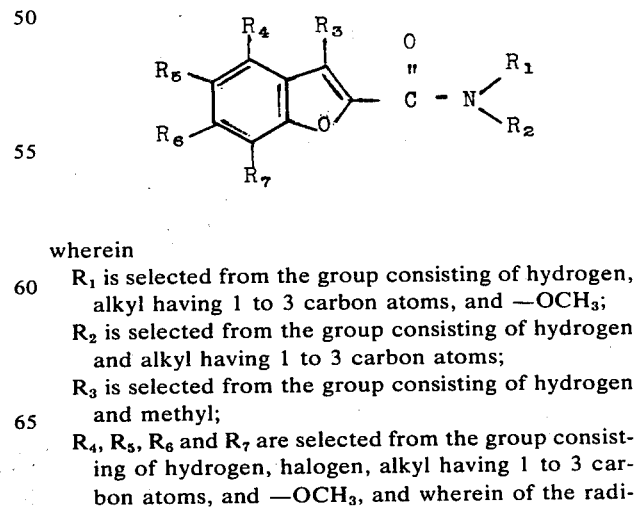

wherein $R_1$ is selected from the group consisting of hydrogen, alkyl having 1 to 3 carbon atoms, and $-OCH_3$;

$R_2$ is selected from the group consisting of hydrogen and alkyl having 1 to 3 carbon atoms;

$R_3$ is selected from the group consisting of hydrogen and methyl;

$R_4$, $R_5$, $R_6$ and $R_7$ are selected from the group consisting of hydrogen, halogen, alkyl having 1 to 3 carbon atoms, and $-OCH_3$, and wherein of the radicals $R_4$, $R_5$, $R_6$ and $R_7$ at least three are hydrogen and only one is another radical.

2. The method of claim 1 wherein $R_1$ is selected from the group consisting of hydrogen, methyl, ethyl and —$OCH_3$.

3. The method of claim 1 in which $R_2$ is selected from the group consisting of hydrogen, methyl and ethyl.

4. The method of claim 1 in which $R_3$ is selected from the group consisting of hydrogen and methyl.

5. The method of claim 1 in which of the substituents $R_4$, $R_5$, $R_6$ and $R_7$, at least three are hydrogen and the fourth is selected from the group consisting of hydrogen, chlorine, methyl, and —$OCH_3$.

6. The method of claim 1 in which said herbicide is applied as an emulsion concentrate having the following composition:

10 – 50% by weight of active ingredient
20 – 80% by weight of organic solvent, and
5 – 15% by weight of a dispersing agent.

7. The method of claim 1 in which said herbicide is applied as a spraying powder having the following composition:

30 – 80% by weight of active ingredient
10 – 60% by weight of inert ingredients, and
small percentage of a dispersing agent.

8. The method of claim 1 in which said herbicide is applied as a dusting powder containing 5 to 25% by weight of active ingredient and 10 – 60% by weight of inert ingredients.

9. The method of claim 1 in which said herbicide has a grain size of less than 20 $\mu$.

* * * * *